United States Patent [19]
Kobylivker et al.

[11] Patent Number: 6,072,005
[45] Date of Patent: Jun. 6, 2000

[54] BREATHABLE FILMS AND PROCESS FOR PRODUCING THEM

[75] Inventors: Peter Michailovich Kobylivker, Marietta; Kevin George Hetzler, Alpharetta, both of Ga.

[73] Assignee: Kimberly-Clark Worldwide, Inc., Neenah, Wis.

[21] Appl. No.: 08/962,564

[22] Filed: Oct. 31, 1997

[51] Int. Cl.[7] .................................................. C08L 23/00
[52] U.S. Cl. .......................................... 525/240; 524/536
[58] Field of Search ........................... 525/240; 428/195; 524/536

[56] References Cited

U.S. PATENT DOCUMENTS

| | | |
|---|---|---|
| 3,844,865 | 10/1974 | Elton et al. . |
| 3,891,008 | 6/1975 | D'Entremont . |
| 4,075,290 | 2/1978 | Denzel et al. . |
| 4,125,662 | 11/1978 | Weiner et al. . |
| 4,169,910 | 10/1979 | Graboski . |
| 4,275,120 | 6/1981 | Weiner . |
| 4,291,092 | 9/1981 | Weiner . |
| 4,297,408 | 10/1981 | Stead et al. . |
| 4,339,494 | 7/1982 | Weiner . |
| 4,672,091 | 6/1987 | Berta . |
| 4,791,144 | 12/1988 | Nagou et al. . |
| 4,878,974 | 11/1989 | Kagawa . |
| 4,959,396 | 9/1990 | Yankov et al. . |
| 4,975,469 | 12/1990 | Jacoby et al. . |
| 5,169,712 | 12/1992 | Tapp . |
| 5,176,953 | 1/1993 | Jacoby et al. . |
| 5,236,963 | 8/1993 | Jacoby et al. . |
| 5,266,392 | 11/1993 | Land et al. . |
| 5,272,326 | 12/1993 | Fujita et al. . |
| 5,317,035 | 5/1994 | Jacoby et al. . |
| 5,322,728 | 6/1994 | Davey et al. . |
| 5,571,619 | 11/1996 | McAlpin et al. . |
| 5,594,070 | 1/1997 | Jacoby et al. . |

FOREIGN PATENT DOCUMENTS

| | | | |
|---|---|---|---|
| 380353 | 8/1990 | European Pat. Off. | ........ B29C 55/00 |
| 444671 | 9/1991 | European Pat. Off. | ...... C08F 297/08 |
| 527589 | 2/1993 | European Pat. Off. | ........ C08L 23/10 |
| 0712892 | 5/1996 | European Pat. Off. . | |
| 716121 | 6/1996 | European Pat. Off. | ........ C08L 23/10 |
| 95/16562 | 6/1995 | WIPO | .............................. B32B 5/24 |
| 9527005 | 10/1995 | WIPO . | |

*Primary Examiner*—Janet Baxter
*Assistant Examiner*—Yvette M. Clarke
*Attorney, Agent, or Firm*—Pauley Petersen Kinne & Fejer

[57] ABSTRACT

A breathable film having improved physical and barrier properties includes a stretched impact modified polyolefin matrix and a particulate filler. The impact modified polyolefin matrix includes at least one impact polypropylene copolymer, alone or in combination with other polymers. The film, and laminates including the film, provide excellent moisture breathability and excellent barrier to penetration by liquids. Laminates including the film may be used in diaper outercovers and other applications requiring breathability and resistance to penetration by liquids.

32 Claims, 2 Drawing Sheets

BREATHABLE FILMS AND PROCESS FOR PRODUCING THEM

FIELD OF THE INVENTION

This invention is directed to breathable polyolefin films having improved physical and barrier properties compared to conventional films of the same thickness. The invention also includes a method for making the breathable films having high impact strength.

BACKGROUND OF THE INVENTION

Vapor permeable, liquid impermeable polymeric films are known in the art. One method of making a polymeric film vapor permeable, includes mixing a matrix polymer with a substantial quantity (e.g. 10–70% by weight) of an organic or inorganic particulate filler such as, for example, calcium carbonate, and extruding a film from the blend. The matrix polymer may include a polyolefin, for instance polypropylene or polyethylene, various olefin copolymers, and/or polymer blends. The film may be a monolayer film, a multilayer film which contains the filled layer as a primary layer, or a multilayer film having more than one filled layer.

Then, the film is heated and stretched, causing voids to form in the areas surrounding the filler particles. The voided film is characterized by thin polymer membranes and/or fine pore networks which permit the molecular diffusion of water vapor through the film, but which block the passage of liquids. In essence, a tortuous path is created from one film surface to the other which permits transfer of vapors but not liquids.

Breathable films are employed in backsheets, for example as a backsheet component laminated to a nonwoven web and/or other layers, in many of today's personal care absorbent articles. Diapers are one example. Filled, stretched polyolefin films provide good water vapor transmission, making the diapers more comfortable to the wearer. As a result, the relative humidity and temperature within the diaper or other product can be reduced using laminates of breathable films and nonwoven webs. The breathable films themselves provide vapor breathability and liquid barrier, but are typically not strong enough to be used alone. The nonwoven webs provide strength as well as fabric-like properties to the laminates.

SUMMARY OF THE INVENTION

The present invention is a liquid pressure resistant breathable microporous polyolefin film having improved physical properties and barrier to water, urine and other water-based liquids compared to conventional breathable films of the same thickness. The invention also includes a method of making the breathable film having improved physical properties and barrier to water and water-based liquids. The breathable film includes about 30–90% by weight of an impact modified polyolefin matrix and about 10–70% by weight of a particulate filler, based on the weight of the film.

The liquid pressure resistant film is prepared by blending the impact modified polyolefin with the filler to form a substantially homogeneous dispersion of the filler in the polymer. Then, the blend is extruded into either a single-layer film or a multilayer film having the filled layer as one of its components. The film is then stretched at an elevated temperature below the melting temperature of the polymer, by about 1.1–7.0 times its original length in at least one direction. As the film is stretched, voids form around the filler particles resulting in the breathable film.

The impact modified polyolefin matrix includes from about 5–100% of an impact polypropylene copolymer, based on the weight of the polymer matrix. The impact polypropylene copolymer includes about 10–90 parts by weight of a first polymer segment A, about 10–90 parts by weight of a second polymer segment B, and optionally about 0–20 parts by weight of a third polymer segment C. The polymer segment A is mostly crystalline and is a propylene homopolymer or random propylene copolymer containing about 0–10% by weight of ethylene or a $C_4$–$C_{10}$ alpha-olefin comonomer. The polymer segment B is a mostly amorphous random copolymer containing about 20–80% by weight propylene and about 20–80% by weight ethylene or a $C_4$–$C_{10}$ alpha-olefin comonomer. The optional polymer segment C is mostly crystalline, and is a homopolymer or copolymer containing about 80–100% by weight of ethylene or a $C_4$–$C_{10}$ alpha-olefin and about 0–20% by weight propylene. The polymer segments A, B and C may be chemically linked together in blocks, or may be blended) or both.

The impact modified polyolefin matrix may also contain about 0–95% by weight of one or more additional polyolefins, based on the weight of the matrix. The additional polyolefins may, for example, include one or more of high density polyethylene, low density polyethylene, linear low density polyethylene, very low density polyethylene, polypropylene homopolymer, propylene-ethylene block copolymers, and propylene-ethylene random copolymers. The additional polyolefins may include another impact polypropylene polymer, or another impact polymer.

By using an impact polypropylene copolymer contributing some or all of the polymer matrix, a breathable film is provided which has high strength and integrity, and which provides an excellent barrier to penetration by liquids (including pressurized liquids).

With the foregoing in mind, it is a feature and advantage of the invention to provide a breathable microporous filled polyolefin film having improved strength, and laminates of the film to one or more additional layers.

It is also a feature and advantage of the invention to provide a breathable microporous filled polyolefin film having improved barrier to liquid insults, including liquid insults applied under pressure, while remaining permeable to water vapor.

It is also a feature and advantage of the invention to provide laminates of the high strength filled polyolefin film to a spunbond web and/or other layers, and surgical gowns, wipes, and absorbent articles incorporating the laminates, which provide improved barrier to liquid insults.

The foregoing and other features and advantages of the invention will become further apparent from the following detailed description of the presently preferred embodiments, read in conjunction with the accompanying drawings. The detailed description and drawings are intended to be illustrative rather than limiting, the scope of the invention being defined by the appended claims and equivalents thereof.

DETAILED DESCRIPTION OF THE PRESENTLY PREFERRED EMBODIMENTS

The term "liquid pressure resistance" refers to the ability of a composition or film made therefrom to withstand the application of a load of liquid without fracturing, bursting or tearing. The liquid pressure resistance of a film depends on the thickness of the film, the material composition of the film, how the film is made and processed, the surrounding environment, and the method of testing. Methods of testing the liquid pressure resistance of a film or material include without limitation the Hydrostatic Pressure Test described in Method 5514 of Federal Test Methods Standard No. 191A, which is equivalent to AATCC Test Method 127-89 and INDA Test Method 80.4-92.

The term "impact modifier" refers generally to an additive, usually an elastomer or different type of plastic, which is incorporated into a plastic film or composition to improve its impact resistance. The term "impact modified," as used herein, refers to a film or material whose liquid pressure resistance (sometimes referred to as hydrohead pressure) has been made higher compared to prior art films and materials through the use of an impact modifier or a high impact material.

The present invention is directed to a liquid pressure resistant breathable polyolefin film. The term "high liquid pressure resistant" film includes both films made entirely of impact polymers mixed with filler, and films made from mixtures of conventional polymers (e.g. polyethylene or polypropylene) with impact polymers or impact modifiers, and filler. This quality is important whether the film is used in diaper backings or other applications.

Figure 1:
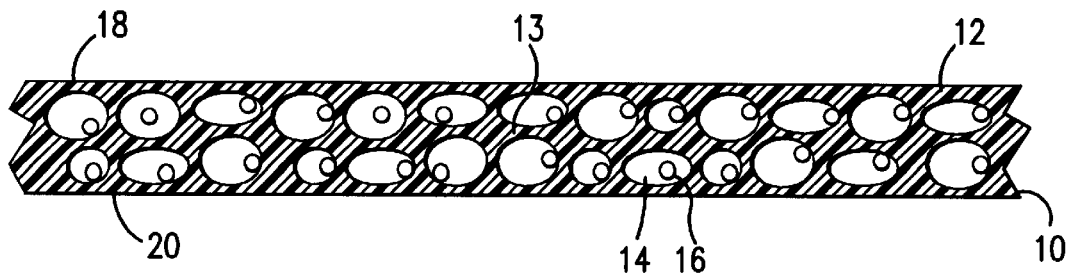
FIG. 1 is a cross-sectional view of an impact modified breathable filled polyolefin film of the invention.

Referring to FIG. 1, a single layer liquid pressure resistant breathable film 10 is shown. The film 10 includes a polymer matrix 12, a plurality of voids 14 surrounded by relatively thin microporous membranes 13 defining tortuous paths, and one or more filler particles 16 in each void 14. The film 10 is microporous and breathable. The microporous membranes 13 between the voids permit molecular diffusion of water vapor from a first surface 18 to a second surface 20 of the film 10.

The impact polymer, which forms part or all of the polymer matrix 12 of the film 10, may include about 10–90 parts by weight of a first polymer segment A, about 10–90 parts by weight of a second polymer segment B, and optimally about 0–20 parts by weight of a third polymer segment C. The polymer segment A is preferably at least about 80% crystalline, and includes about 90–100% by weight propylene, as a homopolymer or random copolymer with about 0–10% by weight of ethylene or a $C_4$–$C_{10}$ alpha-olefin comonomer. The presently preferred polymer segment A is a random copolymer of propylene with a comonomer. The presently preferred comonomers are ethylene and butene. A highly preferred polymer segment A is a random copolymer including about 94–98% by weight propylene and about 2–6% by weight ethylene.

The polymer segment B is less than about 50% crystalline, and is preferably substantially amorphous. The polymer segment B is a random copolymer containing about 20–80% by weight propylene and about 20–80% by weight ethylene or a $C_4$–$C_{10}$ alpha-olefin comonomer. Preferably, the polymer component B contains about 30–70% by weight propylene and about 30–70% by weight of the comonomer. The presently preferred comonomers are ethylene and butene. A highly preferred polymer segment B is a random copolymer containing about 45–65% by weight propylene and about 35–55% by weight ethylene.

The polymer segment C, when present, is more than about 50% crystalline. The polymer segment C is a homopolymer or random copolymer containing about 80–100% by weight ethylene or a $C_4$–$C_{10}$ alpha-olefin, and about 0–20% by weight propylene. Again, ethylene and butene are the preferred comonomers. Generally, the comonomer will be the same for the polymer segments A, B and C.

The polymer segments A, B and C may be chemically linked, as in a block copolymer, or may be intimately blended together, or may be present as both chemically linked segments and blended segments. The impact polymer may be prepared using heterophasic polymerization techniques known in the art. For heterophasic polymerization, a single reactor is used to make the different polymer segments at different stages of the reaction. In a first reaction stage, the propylene-rich segment A can be produced by controlling the levels of propylene and comonomer (if any) to produce a highly crystalline propylene homopolymer or copolymer. Then, in a second reaction stage, the level of comonomer may be increased relative to the level of propylene entering the reactor, to produce the mostly amorphous polymer segment B. The polymer segment C may result as a by-product during the production of the polymer segment B, or may be produced in a third reaction stage by substantially increasing the level of comonomer relative to the level of propylene entering the reactor. It is believed that heterophasic polymerization yields an impact polymer whose segments A, B and C are chemically linked so that one molecule may contain a polymer segment A, a polymer segment B, and optionally a polymer segment C.

Preferably, the impact polymer described above will contain about 25–75 parts by weight of the first segment A, about 25–75 parts by weight of the second segment B, and about 0–10 parts by weight of the third segment C. More preferably, the impact polymer will contain about 40–60 parts by weight of the first segment A, about 40–60 parts by weight of the second segment B, and about 0–10 parts by weight of the third segment C.

Alternatively, the impact copolymer may comprise a random copolymer of propylene and butene including about 75–95% by weight propylene and about 5–25% by weight butene, preferably about 80–90% by weight propylene and about 10–20% by weight butene, more preferably about 82–86% by weight propylene and about 14–18% by weight butene.

In addition to the impact polymer described above, the polymer matrix may contain one or more additional polymers blended with the impact polymer. Examples of suitable additional polymers include without limitation high and low density polyethylene, polypropylene, copolymers of mainly ethylene with about 5–15% by weight $C_3$–$C_{12}$ alpha-olefins (commonly known as linear low density polyethylene), copolymers of mainly ethylene with about 15–30% by weight $C_3$–$C_{12}$ alpha-olefins (commonly known as very low density polyethylene), copolymers of mainly propylene with ethylene and/or $C_4$–$C_{12}$ alpha-olefins, and flexible polyolefins including propylene-based polymers having both atactic and isotactic propylene groups in a main polypropylene chain. Other suitable matrix polymers include without limitation elastomers, for example polyurethanes, copolyether esters, polyamide polyether block copolymers, ethylene vinyl acetate copolymers, block copolymers having the general formula A—B—A' or A—B such as copoly(styrene/ ethylene-butene), styrene-poly(ethylene-propylene)-styrene, styrene-poly(ethylene-butylene)-styrene, polystyrene/poly(ethylene-butylene)/polystyrene, poly (styrene/ethylene-butylene/styrene), and the like.

A preferred additional polymer (for use with a segmented impact polypropylene copolymer described above) is very low density polyethylene, which is substantially amorphous and has a density of about 0.87–0.91 grams/cm$^3$. The very low density polyethylene can be made using either a metallocene or a Ziegler-Natta catalyst, and is preferably made using a metallocene catalyst. Another suitable additional polymer (for use with a random propylene-butene impact polymer described above) is a random propylene-ethylene copolymer including about 90–100% by weight propylene and about 0–10% by weight ethylene, preferably about 93–97% by weight propylene and about 3–7% by weight ethylene.

The impact polymer is suitably prepared using a Ziegler-Natta catalyst system, but can also be made using a constrained geometry and/or metallocene catalyst system. Constrained geometry and/or metallocene-catalyzed polyolefins are described, for instance, in U.S. Pat. Nos. 5,571,619; 5,322,728; and 5,272,326, the disclosures of which are incorporated herein by reference. Polymers made using metallocene catalysts have a very narrow molecular weight range. Polydispersity numbers (Mw/Mn) of below 4 and even below 2 are possible for metallocene-catalyzed polymers. These polymers also have a controlled short chain branching distribution compared to otherwise similar Ziegler-Natta catalyzed polymers. It is also possible, using a metallocene catalyst system, to closely control the isotacticity of the polymer.

The polymer matrix 12 of the film 10 includes about 5–100% by weight of the impact polymer described above, and about 0–95% by weight of the one or more additional polymers. Preferably, the polymer matrix includes about 25–90% by weight of the impact polymer and about 10–75% by weight of the one or more additional polymers. Most preferably, the polymer matrix includes about 50–75% by weight of the impact polymer and about 25–50% by weight of the one or more additional polymers. One polymer matrix, suitable for use in diaper backings, includes about 50–65% by weight of an impact-modified propylene-ethylene copolymer in which the first segment A contains about 2–6% by weight ethylene, the second segment B includes about 40–60 % by weight ethylene and the segments are present in roughly equal amounts; and about 35–50% by weight of a random propylene-ethylene copolymer. Another polymer matrix, suitable for use in diaper backings, includes about 50–65% by weight of the same impact-modified propylene ethylene copolymer and about 35–50% by weight of a metallocene-catalyzed very low density polyethylene having a density of about 0.87 grams/cm$^3$.

The polymer matrix itself constitutes about 30–90% by weight of the high impact breathable film layer 10, preferably about 35–75% by weight, most preferably about 35–60% by weight. The film 10 also includes about 10–70% by weight of at least one particulate inorganic and/or organic filler 16, preferably about 25–65% by weight, most preferably about 40–65% by weight. The filler particles 16 are preferably small, in order to maximize water vapor transmission through the voids 14. Generally, the filler particles 16 should have a mean particle diameter of about 0.1–7.0 microns, preferably about 0.5–7.0 microns, most preferably about 0.8–2.0 microns.

The filler particles 16 in the high impact film layer may be selected from a wide variety of inorganic and organic fillers. Suitable inorganic fillers include without limitation calcium carbonate, non-swellable clays, silica, alumina, barium sulfate, sodium carbonate, talc, magnesium sulfate, titanium dioxide, zeolites, aluminum sulfate, diatomaceous earth, magnesium carbonate, barium carbonate, kaolin, mica, carbon, calcium oxide, magnesium oxide, and aluminum hydroxide. The inorganic filler may also be a swellable material such as sodium bentonite clay.

Suitable organic fillers include non-swellable polymer particles as well as water-swellable superabsorbent particles. Natural superabsorbent particles include guar gum, agar, pectin and the like. Synthetic superabsorbent particles include hydrogel polymers such as alkali metal salts of polyacrylic acids, polyacrylamides, polyvinyl alcohol, ethylene-maleic anhydride copolymers, polyvinyl ethers, methyl cellulose, carboxymethylcellulose, hydroxypropyl cellulose, polyvinyl morpholinone, and polymers and copolymers of vinyl sulfonic acid, polyacrylates, polyacrylamides, polyvinyl pyrridine, and the like. Other suitable polymers include hydrolyzed acrylonitrile grafted starch, acrylic acid grafted starch, and isobutylene maleic anhydride polymers and mixtures thereof The hydrogel polymers are preferably lightly crosslinked to render them substantially water insoluble. Crosslinking may be accomplished by irradiation or by covalent, ionic, Van Der Waals, or hydrogen bonding.

The polymer film thickness, composition, filler content, filler particles size and degree of stretching are factors which help determine the breathability of the high impact microporous film layer 10. Generally, the film layer 10 will be less than about 50 microns thick, preferably less than about 30 microns thick, more preferably less than about 20 microns thick. The film 10 may be uniaxially or biaxially stretched The film may be uniaxially stretched to about 1.1–7.0 times its original length, preferably to about 1.5–6.0 times its original length, more preferably to about 2.5–5.0 times its original length. The film 10 may alternatively be biaxially stretched using techniques familiar to persons skilled in the art.

Figure 2:
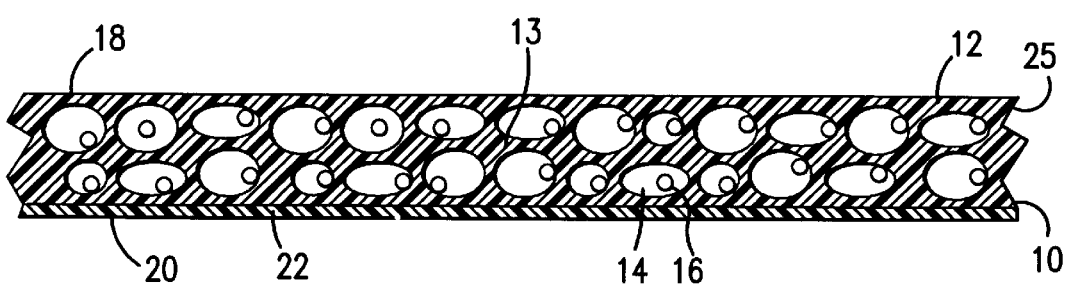
FIG. 2 is a cross-sectional view of a two-layer breathable film including an impact modified breathable filled layer.
Figure 3:
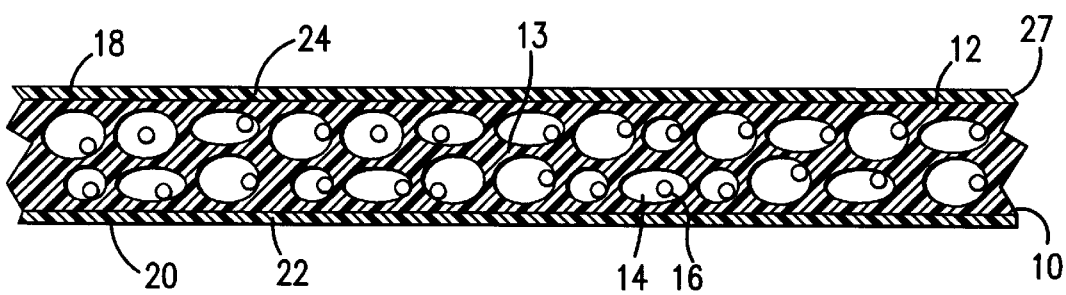
FIG. 3 is a cross-sectional view of a three-layer breathable film including an impact modified breathable filled layer.

In the embodiment of FIG. 2, the liquid pressure resistant breathable film layer 10 has a relatively thin outer skin layer 22 adjacent to it, in a two-layer film 25. In the embodiment of FIG. 3, the breathable film layer 10 is sandwiched between two outer skin layers 22 and 24, in a three-layer film 27. The inclusion of skin layers improves film processability and can also contribute heat seal properties to the multilayer films 25 and 27. The multilayer films 25 and 27 can be prepared by cast or blown film coextrusion of the layers, by extrusion coating, or by any conventional layering process. The polymers in the skin layers 22 and 24 can be the same or different from the polymers in the breathable microporous layer 10. Preferably, the polymers in the outer layer or layers have a lower softening point than in the breathable microporous layer 10, and contribute to the heat sealability of the films 25 and 27. The skin layer may or may not include a filler, but should be water vapor-breathable.

Also, the thickness and composition of the skin layers 22 and 24 should be selected so as not to substantially impair the moisture transmission through the breathable layer 10. After stretching the film, the skin layers 22 and 24 each are generally less than about 10 microns thick, preferably less than about 5 microns thick, more preferably less than about 2.5 microns thick. After stretching, the overall film preferably has a basis weight of not more than about 25 grams/m$^2$. Preferred skin layer polymers include ethylene vinyl acetates, propylene vinyl acetates, ethylene methyl acrylates, polystyrene polyamides, other vapor-permeable polymers, and blends of these with each other and with other polyolefins. The skin layers 22 and 24 may also include lesser quantities (e.g. about 0–40% by weight) of particulate fillers to further enhance their breathability.

Regardless of whether the high impact breathable microporous layer 10 is a monolayer film or a constituent of a multilayer film, the overall film should be constructed to function as a breathable microporous film having a water vapor transmission rate (WVTR) of at least about 300 gram/m$^2$–24 hours, measured using the procedure described below. Preferably, the overall film should have an WTR of at least about 1200 grams/m$^2$–24 hours, most preferably at least about 2000 grams/m$^2$–24 hours.

Figure 5:
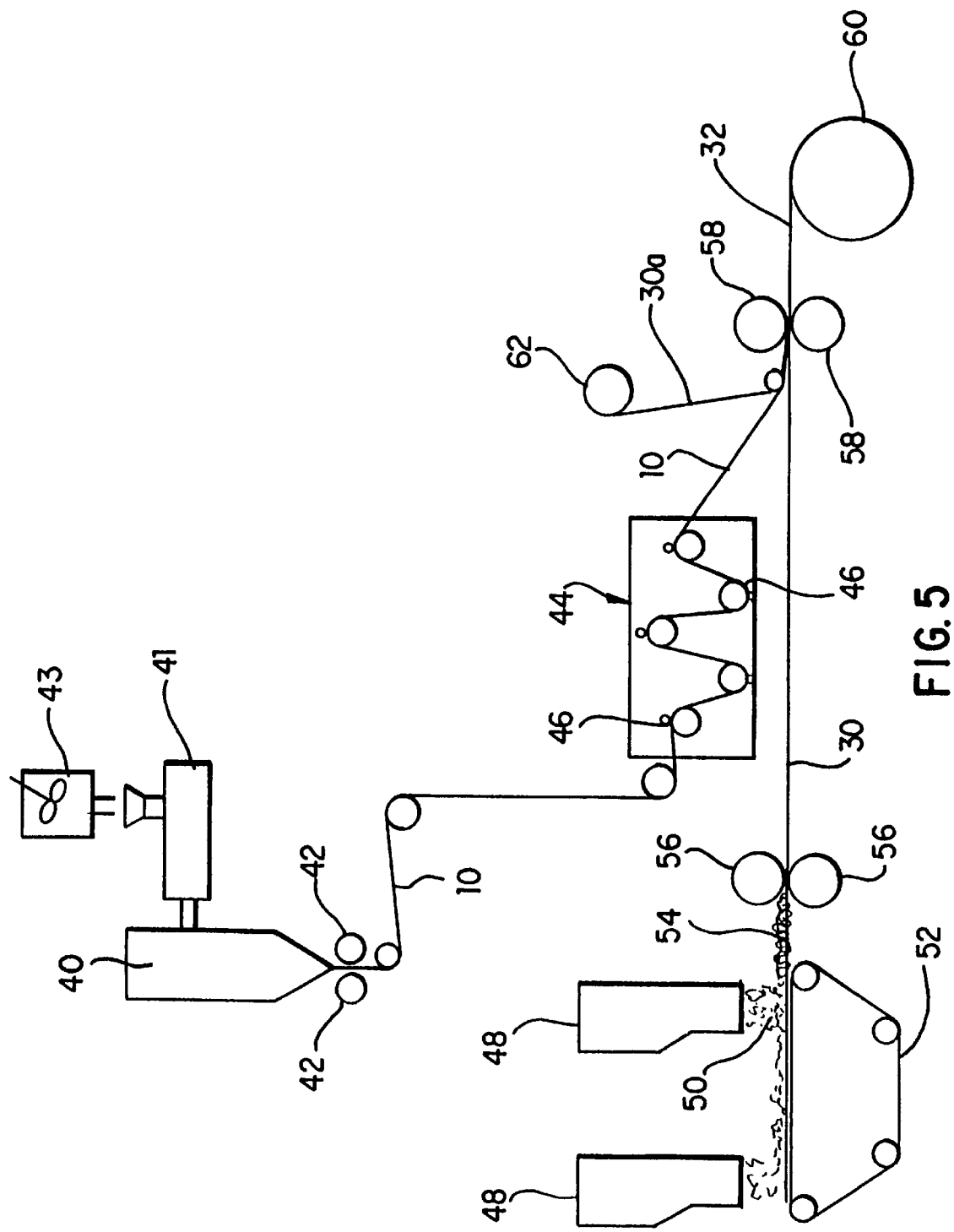
FIG. 5 is a schematic diagram of a process for making an impact-modified breathable polyolefin film and laminate.

FIG. 5 illustrates a process for preparing a liquid pressure resistant breathable microporous film, and a laminate of the film to a nonwoven web. Referring to FIG. 5, the film 10 is formed from a film extrusion apparatus 40, which can be a cast or blown film unit, and which can be in-line or off-line. Typically, the apparatus 40 will include an extruder 41. Filled resin including the polymer matrix material and filler is prepared in a mixer 43 and directed to extruder 41. The film 10 is extruded between a pair of nip or chill rollers 42, one of which may be patterned to impart an embossed pattern to the newly formed film 10. The film may alternatively be flat cast onto only one chill roller.

From the film extrusion apparatus 40 or off-line supply rolls, the filled film 10 is directed to a film stretching unit 44 which can be a machine direction orienter, commercially available from vendors including the Marshall and Williams Co. of Providence, R.I. The stretching unit 44 includes a plurality of pairs of stretching rollers 46, with each subsequent pair moving at a progressively faster speed than the preceding pair. The rollers 46 apply an amount of stress and progressively stretch the filled film 10 to a stretched length, where the film 10 becomes microporous and breathable. As shown, the film 10 is stretched only in the machine direction, which is the direction of travel of the film 10 through the process in FIG. 5.

Advantageously, the film 10 may be uniaxially stretched to about 3–4 times its original length, using an elevated stretch temperature of about 150–200° F. for most polyolefin-based films. The elevated stretch temperature can be sustained by heating some of the stretch rollers 46. The optimum stretch temperature varies with the type of matrix polymer in the film 10, and is always below the melting temperature of the matrix polymer.

Figure 4:
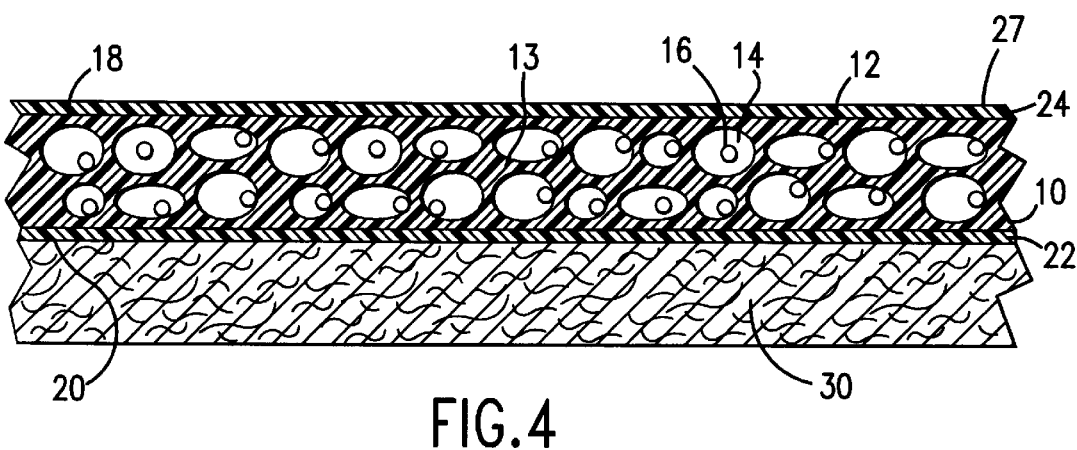
FIG. 4 is a cross-sectional view of a laminate of an impact modified breathable polyolefin film and a spunbond web.

The liquid pressure resistant breathable microporous film 10 may be laminated to one or more substrates, such as a conventional nonwoven web, using conventional adhesive bonding or thermal bonding techniques known in the art. The type of substrate and bonding will vary depending on the end use application. An example of a laminate is shown in FIG. 4, wherein a nonwoven web 30 is laminated to the multilayer film 27 of FIG. 3. In the embodiment shown, the web 30, which can be a spunbonded web of polypropylene or polyethylene, is bonded to the heat seal layer 22 of the multilayer film 27 to form a laminate suitable for use in surgical gowns, diaper backings, and other breathable end use applications.

Referring again to FIG. 5, the film 10 may be laminated to nonwoven web 30 immediately after the film is stretched and immediately following manufacture of the nonwoven web. The nonwoven web 30, which can be a spunbonded web, is formed by dispersing polymer filaments 50 from a pair of conventional spinnerette 48, onto a conveyor assembly 52. The filaments 50 are deposited onto the conveyor to form mat 54. The filaments 50 of mat 54 are then compressed to cause inter-filament bonding using a pair of nip rollers 56, resulting in the spunbonded web 30. The spunbonded web 30 is then transported to the calender bonding rollers 58 and is thermally bonded to one side of the film 10. The film 10 in FIG. 5 is simultaneously bonded on its other side to a second material 30a originating from a supply roll 62. The second material 30a may be a second nonwoven web, or another film layer. The resulting laminate 32 is wound and stored onto a supply roll 60.

Other examples of laminates and end uses in which the liquid pressure resistant breathable microporous film 10 may be useful are described in various patents and patent applications assigned to Kimberly-Clark Worldwide, Inc. These include without limitation U.S. application Ser. No. 08/359,986, filed Dec. 20, 1994; U.S. application Ser. No. 08/755,692, filed Nov. 25, 1996; and U.S. application Ser. No. 08/777,365, filed Dec. 27, 1996. These patent applications are incorporated herein by reference in their entirety.

Test Procedures

Water Vapor Transmission Rate (WVTR)

The following procedure is described for testing of the water vapor transmission rate (WVTR) for the liquid pressure resistant breathable films of the invention. The WVTR is measured in a manner similar to ASTM Standard Test Method for Water Vapor Transmission of Materials, Designation E-96-80 as follows. For the purposes of the present invention, 3 inch diameter (76 mm) circular samples are cut from the test material and from a control material, CELGARD® 2500 (Hoechst Celanese Corporation). CELGARD 2500 is a 0.0025 cm thick film composed of microporous polypropylene. Two or three samples are prepared for each material. Test cups used for testing are cast aluminum, flanged, 2 inches deep and come with a mechanical seal and neoprene gasket. The cups are distributed by Thwing-Albert Instrument Company, Philadelphia, Pa., under the designation Vapometer cup #681. One hundred millimeters of distilled water is poured into each Vapometer cup, and each of the individual samples of the test materials and control material are placed across the top area of an individual cup. Flanges are tightened to form a seal along the edges of the cups leaving the associated test material or control material exposed to the ambient atmosphere over a 62 millimeter diameter circular area (an open, exposed area of about 30 cm$^2$). The cups are then weighed, placed on a tray, and set in a forced air oven set at 100° F. (38° C.). The oven is a constant temperature oven with external air through it to prevent water vapor accumulation inside. A suitable forced air oven is, for example, a Blue M Power-O-Matic 60 oven distributed by Blue M Electric Co. of Blue Island, Ill. After 24 hours, the cups are removed from the oven and weighed. The preliminary, test WVTR value is calculated as follows:

Test WVTR=[(grams weight loss over 24 hours)×7571]÷24

The relative humidity within the oven is not specifically controlled. Under predetermined set conditions of 100° F. and ambient relative humidity, the WVTR for CELGARD 2500 has been determined to be 5000 g/m$^2$/24 hours. Accordingly, CELGARD 2500 is run as a control sample with each test and the resulting values are corrected in accord with the variation of the control relative to its known WVTR.

Tensile Test (% Ultimate Elongation)

The percentage ultimate elongation can be measured using a constant rate of extension tester such as an Instron Tester (Instron Corp., Canton, Mass.); a Thwing-Albert Tester (Thwing-Albert Instrument Co., Philadelphia, Pa.); or a Sintech Tester (Sintech Corp., Cary, N.C.). The tester is mounted with two sets of grips (jaws), each set having a front and rear face measuring three inches perpendicular to the direction of load application and one inch parallel to the direction of load. Each jaw should have a smooth, rubberized gripping surface.

Representative samples are taken from areas of the test material that are free of folds, wrinkles, or other abnormal distortions. At least three samples 3 inches wide and 6 inches long are from the material preferably at evenly spaced locations across the width of the material. The equipment is calibrated according to manufacturer's instructions.

Then, to set up equipment:

1. Set the distance between the clamps (gage length) at 3.0±0.05 in. (75±1 mm).
2. Select and install a load cell that has the proper range for the material being tested and/or some testing machines will require that the force range be selected so that the break will occur between 10 and 90% of full scale force.
3. Set the testing machine extension rate of 12±0.5 in./min (300±10 mm/min).
4. Set the break sensitivity at 20% or at a higher level if the material requires it.
5. Set the % strain points:

| | | |
|---|---|---|
| 1 | to | 1% |
| 2 | to | 2% |
| 3 | to | 3% |
| 4 | to | 4% |
| 5 | to | 5% |
| 6 | to | 6% |
| 7 | to | 7% |
| 8 | to | 8% |
| 9 | to | 9% |
| 10 | to | 10% |

The machine may also be set to any other desired % strain.

The test material is conditioned, and the test is conducted, at ambient conditions of 73.4±3.6° F. and 50±5% relative humidity. To test the sample, each sample is mounted securely in the clamps of the testing equipment. The entire sample width should be held in the jaws and the long dimension of the sample should be essentially parallel to the direction of force application. Then, the sample is pulled by the equipment until it breaks. The percentage ultimate elongation is determined by observing the length of the sample which is not clamped inside the jaws (a) before pulling the sample, and (b) when the sample is pulled to the point of breakage. If a sample specimen slips in the jaws, or breaks at the edge of or in the jaws, results for that sample are disregarded. Additional samples are measured until at least three good readings are obtained.

EXAMPLES

Six different filled polymer formulations were compounded, made into film on a blown film line, and then uniaxially stretched using a machine direction orienter. The resulting films were tested for WVTR, and some were tested for hydrohead pressure (liquid pressure resistance), using the procedures identified above. Some were also tested for tensile strength using the procedure described above. The following polymers were used in the formulations:

A. Exxon ICP PD-7623 E7, an impact copolymer containing 91% by weight propylene and 9% by weight ethylene and having a melt flow rate (230° C.) of 7–10 grams/10 min., a density of 0.90 grams/cc, and about 45% crystallinity. This copolymer contains straight propylene segments and ethylene-propylene rubber segments.

B. Union Carbide 6D82, a propylene-ethylene random copolymer containing 94.5% by weight propylene and 5.5% by weight ethylene, and having a melt flow rate (230° C.) of 7 grams/10 min.

C. Dow NG3310, a linear low density polyethylene copolymer containing 93% by weight ethylene and 7% by weight octene and having a melt index (190° C.) of 3.3 grams/10 min. and a density of 0.917 grams/cm$^3$.

D. Dow ELITE 5200, a metallocene-catalyzed linear low density polyethylene copolymer containing 93% by weight ethylene and 7% by weight octene, and having a melt index (190° C.) of 4 grams/10 min. and a density of 0.917 grams/cc.

E. Dow 4012, a conventional branched low density polyethylene having a melt index (190° C.) of 12 and a density of 0.916 grams/cc.

The following samples were compounded, made into films having thicknesses of about 1.4 to about 1.7 mils, target 1.5 mils, and uniaxially oriented to about 3.6–4.8 times their original length. Each of the samples contained about 64% by weight of ECC FL-2029 brand calcium carbonate filler particles (1 micron average diameter, 8 micron top cut, coated with behenic acid) and 36% of the polymer blend. The films were made on a single-layer blown film line having extruder barrel zone temperatures of 340, 355, 370 and 360° F. The films were stretched using temperatures ranging from about 170–220° F.

Example 1
Sample #P5058-55E

| | | |
|---|---|---|
| 64% | ECC FL-2029 Coated filler (1 micron, 8 microns top, marble) | |
| 36% | 65% Exxon ICP-PD-7623E7 (9% C2, 7–10 MFR) | 23.4% Total |
| | 35% Union Carbide 6D82 (7 MFR, 5.5% C2) | 12.6% Total |
| | 600 ppm Ronotec Dry 17 Stabilizer (300 ppm effective) | |
| | 600 ppm Irgafos 168 Phosphite | |

Example 2
Sample #P5058-55F

| | | |
|---|---|---|
| 64% | ECC FL-2029 Coated filler (1 micron, 8 microns top, marble) | |
| 36% | 65% Exxon ICP-PD-7623 E7 (9% C2, 7-10 MFR) | 23.4% Total |
| | 35% Metallocene PE-Exact 4049 (4.5 MI, | 12.6% Total |

-continued

| | |
|---|---|
| | 0.87 grams/cm³ density)<br>600 ppm Ronotec Dry 17 Stabilizer (300 ppm effective)<br>600 ppm Irgafos 168 Phosphite |
| | Example 3<br>Sample #P5058-106-1 |
| 65%<br>35% | ECC FL-2029 Coated filler (1 micron, 8 microns top, marble)<br>95% Dow NG 3310 (3.3 MI, 0.917 density)      33.25% Total<br>5% Dow 4012 (12 MI, 0.916 density)      1.75% Total<br>900 ppm Irganox B17 stabilizer<br>400 ppm Irgafos 168 Phosphite |
| | Example 4<br>Sample #P5058-106-2 |
| 65%<br>35% | ECC FL-2029 Coated filler (1 micron, 8 microns top, marble)<br>75% Dow NG 3310      26.25% Total<br>20% Exxon ICP 7623      7.00% Total<br>5% Dow 4012      1.75% Total<br>900 ppm Irganox E17 stabilizer<br>400 ppm Irgaphos 168 Phosphite |
| | Example 5<br>Sample #P5058-106-4 |
| 64%<br>35% | ECC FL-2029 Coated filler (1 micron, 8 microns top, marble)<br>95% Dow ELITE 5200      33.25% Total<br>5% Dow 4012      1.75% Total<br>900 ppm Irganox E17 Stabilizer<br>400 ppm Irgaphos 168 Phosphite |
| | Example 6<br>Sample #P5058-106-5 |
| 65%<br>35% | ECC FL-2029 Coated filler (1 micron, 8 microns top, marble)<br>75% Dow ELITE 5200      26.25% Total<br>20% Exxon ICP 7623      7.00% Total<br>5% Dow 4012      1.75% Total<br>900 ppm Irganox E17 Stabilizer<br>400 ppm Irgaphos 168 Phosphite |

The following results were obtained for WVTR, tensile strength and hydrohead pressure for the oriented films.

| Example | Sample | Stretch | WVTR grams/m²- 24 hrs. | Tensile Test % Ultimate Elongation MD | Tensile Test % Ultimate Elongation CD | Hydro-head Pressure (Millibars) |
|---|---|---|---|---|---|---|
| 1 | P5058-55E | 3.4 | 4700 | | | |
| 2 | P5058-55F | 3.6 | 3800 | 29.3 | 191.6 | |
| 3 | P5058-106-1 | 4.5 | 1871 | 65.3 | 176.7 | 42 |
| 4 | P5058-106-2 | 4.2 | 1536 | 63.3 | 200.1 | 81 |
| 5 | P5058-106-4 | 4.5 | 1956 | 57.5 | 29.1 | 32 |
| 6 | P5058-106-5 | 4.2 | 1846 | 54.5 | 155.4 | 78 |

While the embodiments of the invention disclosed herein are presently considered preferred, various modifications and improvements can be made without departing from the spirit and scope of the invention. The scope of the invention is indicated in the appended claims, and all changes that fall within the meaning and range of equivalents are intended to be embraced therein.

We claim:

1. A breathable film including a breathable microporous polyolefin film layer, the layer comprising:

about 30–90% by weight of an impact modified polyolefin matrix; and about 10–70% by weight of a particulate filler;

the film having an WVTR of at least about 300 grams/m²-24 hours;

wherein the impact-modified polyolefin matrix comprises a blend of first and second polymers selected from a) a heterophasic propylene-ethylene polymer blended with a very low density polyethylene, b) a propylene-butene polymer blended with a propylene-ethylene polymer, and c) combinations thereof.

2. The breathable film of claim 1, wherein the impact propylene copolymer comprises a heterophasic propylene-ethylene polymer including about 10–90 parts by weight of a first polymer segment A, about 10–90 parts by weight of a second polymer segment B, and about 0–20 parts by weight of a third polymer segment C;

the polymer segment A comprising a propylene homopolymer or random copolymer including about 90–100% by weight propylene and about 0–10% by weight of a comonomer selected from the group consisting of ethylene and alpha-olefins having 4–10 carbon atoms;

the polymer segment B comprising a random copolymer including about 20–80% by weight propylene and about 20–80% by weight of a comonomer selected from the group consisting of ethylene and alpha-olefins having 4–10 carbon atoms;

the polymer segment C comprising a random copolymer including about 0–20% by weight propylene and about 80–100% by weight of a monomer selected from the group consisting of ethylene and alpha-olefins having 4–10 carbon atoms.

3. The breathable film of claim 2, wherein the polymer segment A comprises a random copolymer including about 94–98% by weight propylene and about 2–6% by weight ethylene.

4. The breathable film of claim 2, wherein the polymer segment B comprises a random copolymer including about 45–65% by weight propylene and about 35–55% by weight ethylene.

5. The breathable film of claim 1, wherein the impact-modified polyolefin matrix comprises a heterophasic copolymer of propylene and ethylene blended with a very low density polyethylene.

6. The breathable film of claim 1, wherein the impact-modified polyolefin matrix comprises a propylene-butene copolymer blended with a propylene-ethylene copolymer.

7. The breathable film of claim 1, wherein the impact-modified polyolefin matrix comprises a random propylene-butene copolymer and a random propylene-ethylene copolymer.

8. The breathable film of claim 6, wherein the proplyene-butene copolymer comprises about 75–95% by weight propylene and about 5–25% by weight butene.

9. The breathable film of claim 6, wherein the copolymer comprises about 80–90% by weight propylene and about 10–20 % by weight butene.

10. The breathable film of claim 6, wherein the proplyene copolymer comprises about 82–86% by weight propylene-butene and about 14–18% by weight butene.

11. The breathable film of claim 6, wherein the propylene-ethylene copolymer comprises a random copolymer including at least about 90% by weight propylene and up to about 10% by weight ethylene.

12. The breathable film of claim 1, wherein the impact modified polyolefin matrix comprises about 25–90% by weight of the first polymer selected from heterophasic propylene-ethylene polymer and a propylene-butene polymer, and about 10–75% by weight of the second polymer selected from a very low density polyethylene and a propylene-ethylene polymer.

13. The breathable film of claim 12, wherein the impact modified polyolefin matrix comprises about 40–75% by weight of propylene copolymer and about 25–60% by weight of the second polymer.

14. The breathable film of claim 1, comprising about 35–75% by weight of the impact modified polyolefin matrix and about 25–65% by weight of the particulate filler.

15. The breathable film of claim 1, comprising about 40–60 % by weight of the impact modified polyolefin matrix and about 40–60 % by weight of the particulate filler.

16. The breathable film of claim 1, wherein the particulate filler comprises an inorganic filler.

17. The breathable film of claim 16, wherein the inorganic filler comprises a swellable filler.

18. The breathable film of claim 16, wherein the filler comprises calcium carbonate.

19. The breathable film of claim 1, wherein the particulate filler comprises an organic filler.

20. The breathable film of claim 19, wherein the organic filler comprises a superabsorbent polymer.

21. The breathable film of claim 1, wherein the film is stretch oriented at least uniaxially to about 1.1–7.0 times an original length.

22. The breathable film of claim 1, wherein the film is stretch oriented at least uniaxially to about 1.5–6.0 times its original length.

23. The breathable film of claim 1, wherein the film is stretch oriented at least uniaxially to about 2.5–5.0 times its original length.

24. A two-layer film comprising the breathable microporous polyolefin film layer of claim 1, and an adjacent breathable skin layer.

25. A multilayer film comprising the breathable microporous polyolefin film layer of claim 1, sandwiched between two breathable skin layers.

26. A breathable laminate, comprising:
the breathable microporous polyolefin film of claim 1; and
a nonwoven web laminated to the breathable microporous polyolefin film.

27. The laminate of claim 26, wherein the nonwoven web comprises a spunbond web.

28. The laminate of claim 27, wherein the spunbonded web comprises polypropylene.

29. The laminate of claim 26, wherein the film and web are thermally bonded together.

30. The laminate of claim 26, wherein the film and web are adhesively bonded together.

31. The breathable laminate of claim 26, wherein the breathable film has an WVTR of at least about 1200 grams/$m^2$–24 hours.

32. The breathable laminate of claim 26, wherein the breathable film has an WVTR of at least about 2000 grams/$m^2$–24 hours.

* * * * *